Figure 1:
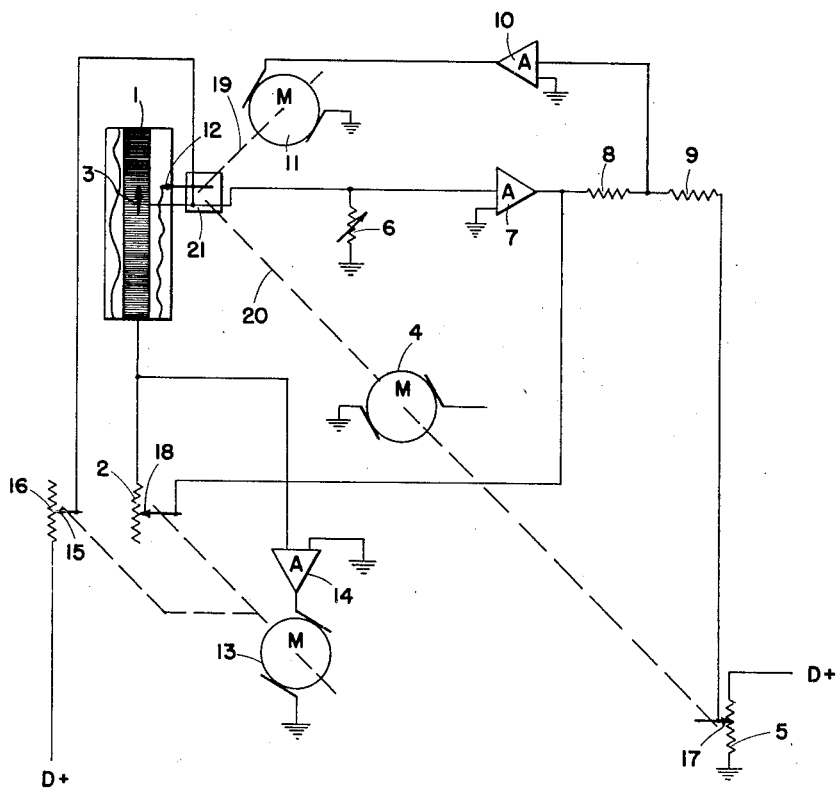

Oct. 27, 1953   H. R. BROWN, JR   2,657,296
POTENTIOMETER COMPENSATING MACHINE
Filed Nov. 24, 1951

*INVENTOR.*
HENRY R. BROWN JR.
BY
*William R. Lane*
ATTORNEY

Patented Oct. 27, 1953

2,657,296

UNITED STATES PATENT OFFICE 2,657,296

POTENTIOMETER COMPENSATING MACHINE

Henry R. Brown, Jr., Downey, Calif., assignor to North American Aviation, Inc.

Application November 24, 1951, Serial No. 258,083

11 Claims. (Cl. 201—62)

This invention relates to precision linear or nonlinear potentiometers, and particularly to a device for compensating potentiometers.

In the computing art a potentiometer is most often used to perform multiplication. If a voltage X is applied to one fixed terminal of a potentiometer, with the other fixed terminal grounded, and if the wiper of the potentiometer is moved through an angle δ, the voltage developed at the wiper will be proportional to the product Xδ. If the voltage developed by the wiper is fed through a fixed load resistor to one fixed terminal of a second potentiometer, the other fixed terminal of which is grounded, a voltage proportional to the product Xδγ is obtained from the wiper of the second potentiometer if the shaft of the second potentiometer is turned through an angle γ. If the voltage from the wiper of the second potentiometer is then fed through a second load resistor to a fixed terminal of a third potentiometer, the other fixed terminal of which is grounded, a voltage proportional to the product Xδγα is developed on the wiper of the third potentiometer if the shaft of the third potentiometer is turned through an angle α. In order that the resultant product may be formed with some precision, the load resistors for the second two potentiometers must be at least two orders of magnitude larger than the total resistance of each of the potentiometers. The result, therefore, is that though the voltage X may be fairly large, the voltage Xδγα will be exceedingly small on account of the size of the intervening resistors. Further, the load resistors provide a parallel path to ground which seriously affects the accuracy of cascaded potentiometers as multiplying devices.

If it is required that a potentiometer, having applied to one of its fixed terminals a given fixed voltage, must supply as the output of its wiper a voltage which is a given function of the potentiometer shaft rotation, it can be seen that the simple utilization of a potentiometer whose resistance vs. shaft rotation function is the same as the voltage vs. shaft rotation function required would not suffice because of the presence of the load resistor. This is true because though the potentiometer is connected as a voltage divider, the voltage at the wiper may not be computed simply by scaling down the supply voltage by the ratio of the resistance between the wiper and one fixed terminal to the total resistance of the potentiometer, but must be computed by reference to Kirchoff's law of currents since the wiper does draw current. In addition, while potentiometers have heretofore been available which would provide a given function of resistance vs. shaft rotation within limits of a few percent, since the tolerance could not be entirely eliminated, it has been necessary to adjust the resistance vs. shaft rotation characteristics of each potentiometer before it could be inserted in a circuit to attain the desired precise result. In addition, tolerances exist upon the total resistance of a potentiometer which therefore necessitated the adjustment of the total resistance of a potentiometer before it could be utilized in a precision computer circuit.

This invention contemplates providing a device for automatically compensating a potentiometer of the type described in patent application Serial No. 255,898, filed November 13, 1951, in the name of Henry R. Brown, Jr., for "Compensated Miniature Potentiometer and Method of Making"— the compensation being applied in such a manner as to provide not only the exact total resistance of a potentiometer required, but also to provide the exact function of voltage output vs. shaft displacement required, with a given fixed input voltage and a given load resistance connected to the wiper of the potentiometer.

It is therefore an object of this invention to provide a potentiometer compensating device adapted to compensate a potentiometer to provide a predetermined resistance vs. shaft rotation function.

It is another object of this invention to provide a potentiometer compensating device adapted to compensate a potentiometer to have a precise predetermined total resistance.

It is another object of this invention to provide means for compensating a potentiometer so that the potentiometer will produce a voltage which is a predetermined function of shaft rotation with a predetermined load.

Figure 2:
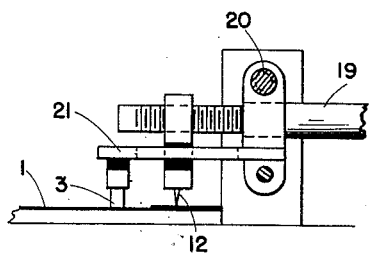

Other objects of invention will become apparent from the following description taken in connection with the accompanying drawings, in which Fig. 1 is a schematic of the invention; and Fig. 2 is a detailed view of a part of the invention.

Referring now to Fig. 1, there is shown a potentiometer resistance element 1 similar to that described in patent application Serial No. 255,898 referred to above, which is required to be compensated. One fixed terminal of element 1 is connected to a fixed terminal of resistor 2. The resistance of resistor 2 is equal to the desired total value of resistance 1. A wiper 3 supported by carriage 21 contacts the central portion of resistance element 1 and is advanced along element 1 at a constant slow speed by lead screw 20 connected to motor 4 which also drives the wiper of potentiometer 5. One fixed terminal of potentiometer 5 is supplied with a constant voltage D, and the other fixed terminal is grounded.

Wiper 3 is electrically connected to one fixed terminal of load resistance 6, whose other fixed terminal is grounded. Resistance 6 is shown as a variable resistance. It is initially set equal to the value of load resistance for which element 1 is desired to be compensated, and during any one compensating operation, is left unaltered. Resistance 6 simulates the load resistance which will be connected to element 1 when it is placed in operation. Wiper 3 is also connected to precision inverting amplifier 7 whose characteristic is that its output is equal to its input in magnitude, but is of opposite polarity. The output of amplifier 7 is connected through resistances 8 and 9 to wiper 17 of potentiometer 5. The common connection between resistances 8 and 9 is connected to the input of servo amplifier 10 which provides electrical drive for servo motor 11. Servo motor 11 drives lead screw 19, producing lateral motion of stylus 12 which cuts into the conducting film on the outer portion of element 1. As carriage 21, shown in detail in Fig. 2, is moved along the length of element 1 exactly in coincidence with wiper 3 by drive motor 4, the lateral motion of the stylus causes the area of conducting film to vary from bar to bar of element 1 and effects the compensation, as will be further explained hereinafter.

The output of inverting amplifier 7 is also connected to wiper 18 of resistance 2. Wiper 18 is driven mechanically by servomotor 13, which is driven electrically by amplifier 14. The input to amplifier 14 is connected to the common connection between the fixed terminals of resistances 1 and 2. Resistance 16 is identical in resistance value with resistance 2, and is thus the same as the desired total resistance of element 1. Wiper 15 of resistance 16 is driven, together with wiper 18, by motor 13, and is connected electrically to wiper 3 of resistance element 1. One fixed terminal of resistance 16 is connected to constant voltage D.

At the start of operation, wiper 3 of resistance element 1, and wiper 17 of potentiometer 5 will be at their lowermost positions in the figure, and wiper 15 of resistance 16 and wiper 18 of resistance 2 will be at their uppermost positions. When motor 4 is started, wipers 3 and 17 will be moved upwards. Current flowing from voltage source D through resistance 16 and resistance 6 to ground will cause a voltage to appear across resistance 6, and hence at wiper 3 and the input to amplifier 7. This voltage will be inverted by amplifier 7 and applied through wiper 18 to the input of amplifier 14. The action of amplifier 14 and motor 13 is to drive wiper 18 of resistance 2 so that the resistance between wiper 18 and the input of amplifier 14 is the same as the resistance between wiper 3 of resistance element 1 and the input of amplifier 14. When this is the case, the voltage at the input to amplifier 14 will be zero, for this point is then the junction between two equal resistances, the opposite ends of which are connected to voltages equal in magnitude but opposite in polarity.

Since this is a continuous process, motor 13 must cause wiper 18 to move continuously, and there must therefore always be some small voltage at the input to amplifier 14; for with absolutely zero input there will be no output and no voltage to drive motor 13. However, the system can be made sensitive enough so that the voltage input to amplifier 14 will be extremely small and the error thus introduced will be of negligible magnitude.

Motor 13 also drives wiper 15 of resistance 16 in a downward direction, and since the total value of resistance 16 is the desired total resistance of resistance element 1, the amount of resistance 16 which is in the circuit at any time is equal to this total desired resistance less the amount between wiper 3 and the lower fixed terminal of resistance element 1. This follows from the facts that wiper 15 and wiper 18 are driven together; resistances 16 and 2 are identical; and the amount of resistance 2 which is in the circuit is equal to the amount of resistance element 1 which is in the circuit, neglecting the error mentioned above.

The result of the above is that the voltage appearing at wiper 3 is the same that would appear at that point were resistance element 1 being used in an actual installation. It is required that resistance element 1 develop the same function of voltage vs. shaft rotation as is developed by potentiometer 5. If resistance element 1 is correct up to the position occupied by wiper 3, since wiper 17 has been advanced to an exactly corresponding position, then the voltage at wiper 3 with load resistance 6 in the circuit would be equal to the voltage at wiper 17. The voltage at wiper 17 is applied to resistance 8. The voltage at wiper 17 is applied to resistance 9, which has identically the same value as resistance 8. With the voltages at wipers 3 and 17 equal, no voltage would appear at the junction of resistances 8 and 9, and hence at the input to amplifier 10. If, however, as would generally be the case, resistance element 1 were not exactly correct, the voltage at wiper 3 would not equal that at wiper 17, and a non-zero signal would appear at the input to amplifier 10, driving motor 11 driving stylus 12 to compensate resistance element 1. This process of compensation continues as long as motor 4 is turned, with the result that the voltage developed by wiper 3, as modified by the presence of load resistor 6, is exactly the same function of shaft rotation as is the voltage developed by wiper 17. The combined value of the portions of element 1 and resistance 16, which are in the circuit, is at all times equal to the total desired resistance of element 1. The compensating operation reaches an end when all of resistance 2 and of element 1 is in the circuit and none of resistance 16 is in the circuit. Hence the resultant total value of resistance element 1 will be equal to the resistance of 2 or of 16, both of which are equal to the desired total resistance of 1.

Although the invention has been described and illustrated in detail, it is to be clearly understood that the same is by way of illustration and example only and is not to be taken by way of limitation, the spirit and scope of this invention being limited only by the terms of the appended claims.

I claim:

1. Means for automatically compensating for load resistance and departure from a predetermined function of resistance versus displacement a film potentiometer resistance element the width of which is determinative of the resistance per unit length, comprising cutting means for varying the effective width of said potentiometer, a master potentiometer having said predetermined function of resistance versus displacement, a load resistance simulating the load resistance to be used in connection with the operation of the potentiometer of which said element is to be a part, means for moving said cutting means along said element in synchronism with said master potentiometer, and servo means for varying said cutting means in response to the difference between the resistance of said element at the instantaneous location of said cutting means as qualified by said load resistance and said master potentiometer to thereby compensate said element.

2. Means for automatically compensating the resistance element of a conducting bar and resistance film type potentiometer, comprising trimming means for rendering noneffective a controllable portion of the resistance of said element, a contact-making wiper on said element, a master potentiometer, means for moving said wiper and said trimming means together and in synchronism with the movement of the wiper on said master potentiometer, a load resistor connected to modify the effective resistance of said element as sampled by said wiper, and means for controlling the amount of trim accomplished by said trimming means in response to the difference between the resistance sampled by the wiper on said master potentiometer and the wiper on said element to thereby compensate said potentiometer element.

3. Means for adjusting the resistance per unit length of a potentiometer resistance element whose unit linear resistance is a function of its lateral dimension, comprising cutting means for varying the lateral dimension of said element, a motor, means for producing a reference voltage which is a predetermined function of the rotation of said motor, a wiper on said element, means for advancing said wiper along said element in synchronism with said motor, means for furnishing to one end of said element a constant direct current voltage, an inverting amplifier with its input taken from said wiper, and means for driving said cutting means in response to the difference between the output of said inverting amplifier and said reference voltage to thereby adjust the resistance per unit length of said potentiometer resistance element to obey said predetermined function.

4. A device as recited in claim 3 and further comprising a predetermined load resistance for qualifying the input to said inverting amplifier whereby said element is compensated for load resistance in the circuit in which it is intended to be used.

5. A device as recited in claim 3 and further comprising means for indicating when the total resistance of said element has reached a predetermined value.

6. Potentiometer compensating means comprising means for adjusting the unit resistance of said potentiometer, a source of reference voltage which varies predeterminately with a shaft rotation, means for supplying to a fixed terminal of said potentiometer a constant direction current voltage, means for moving the wiper on said potentiometer in coordination with said shaft rotation, and means for operating said adjusting means in response to the difference between the voltage on said wiper and said reference voltage to thereby compensate said potentiometer predeterminately.

7. A device as recited in claim 6 and further comprising means for qualifying the operation of said adjusting means in response to the effect of a predetermined load resistance applied to said potentiometer.

8. Apparatus for compensating a film potentiometer of the type whose resistance per unit displacement may be adjusted by varying the effective area of resistive film on the resistance element thereof, comprising a rotatable shaft, means for producing a reference voltage which is a predetermined function of the rotation of said shaft, means for moving the wiper on said potentiometer in response to the rotation of said shaft, means associated with said potentiometer for producing a voltage proportional to the resistance between a fixed terminal of said potentiometer and the wiper of said potentiometer, and means for varying the effective area of resistive film on the resistance element of said potentiometer in response to the difference between said reference voltage and the voltage from said potentiometer to thereby compensate said potentiometer in accordance with said predetermined function.

9. A device as recited in claim 8 and further comprising a resistance simulating the load resistance to be used with said potentiometer connected to the wiper of said potentiometer to thereby compensate said potentiometer for the effect of said load resistance.

10. Means for trimming a film type potentiometer to have a predetermined resistance versus displacement function comprising means for applying a constant voltage to one terminal of said potentiometer, means for producing a reference voltage which is a predetermined function of the displacement of the wiper of said potentiometer, and means responsive to the difference between the voltage on said wiper and said reference for trimming the resistance element of said potentiometer to thereby cause said potentiometer to yield a resistance which is said predetermined function of the displacement of its wiper.

11. Apparatus for compensating a voltage divider to yield a voltage which is a predetermined function of the displacement of its wiper with current being drawn from said wiper by a load resistance comprising a source of reference voltage variable in accordance with said predetermined function of said displacement and means for compensating said voltage divider in response to the difference between the voltage on the wiper thereof and said reference voltage to thereby compensate said voltage divider.

HENRY R. BROWN, JR.

References Cited in the file of this patent

UNITED STATES PATENTS

| Number | Name | Date |
| --- | --- | --- |
| 1,859,930 | Miller | May 24, 1932 |
| 1,962,438 | Flanzer et al. | June 12, 1934 |
| 2,500,605 | De Lange et al. | Mar. 14, 1950 |